United States Patent
Liao

(10) Patent No.: US 8,506,088 B2
(45) Date of Patent: Aug. 13, 2013

(54) AIRFLOW-GUIDING DEVICE AND PROJECTOR

(75) Inventor: Yi-Kuan Liao, Hsinchu County (TW)

(73) Assignee: Young Green Energy Co., Hsinchu County (TW)

( * ) Notice: Subject to any disclaimer, the term of this patent is extended or adjusted under 35 U.S.C. 154(b) by 412 days.

(21) Appl. No.: 12/835,469

(22) Filed: Jul. 13, 2010

(65) Prior Publication Data

US 2011/0102749 A1   May 5, 2011

(30) Foreign Application Priority Data

Oct. 23, 2009 (CN) .......................... 2009 1 0207282

(51) Int. Cl.
  *G03B 21/16* (2006.01)
  *G03B 21/18* (2006.01)
  *G03B 21/26* (2006.01)
  *F21V 29/00* (2006.01)

(52) U.S. Cl.
  USPC ................... 353/61; 353/52; 353/57; 362/294

(58) Field of Classification Search
  USPC ................... 353/52, 57–58, 60–61; 362/294, 362/345, 547
  See application file for complete search history.

(56) References Cited

U.S. PATENT DOCUMENTS

| | | | |
|---|---|---|---|
| 4,078,861 A * | 3/1978 | Bohme | 353/97 |
| 5,860,719 A | 1/1999 | Suzuki et al. | |
| 6,296,359 B1 * | 10/2001 | Baumann | 352/204 |
| 6,739,831 B2 * | 5/2004 | Hsu et al. | 415/60 |
| 7,439,660 B2 | 10/2008 | Pollmann-Retsch et al. | |
| 7,513,626 B2 | 4/2009 | Adachi et al. | |
| 7,775,689 B2 * | 8/2010 | Nishimura et al. | 362/345 |
| 7,916,400 B2 * | 3/2011 | Zou et al. | 359/700 |
| 8,042,951 B2 * | 10/2011 | Lo et al. | 353/52 |
| 8,172,405 B2 * | 5/2012 | Lo et al. | 353/57 |
| 2004/0145896 A1 * | 7/2004 | Watanabe et al. | 362/294 |
| 2006/0017362 A1 | 1/2006 | Uno et al. | |
| 2006/0226752 A1 | 10/2006 | Mulay et al. | |
| 2007/0296927 A1 * | 12/2007 | Chang et al. | 353/52 |
| 2008/0231812 A1 | 9/2008 | Sakai et al. | |
| 2008/0291401 A1 * | 11/2008 | Lo et al. | 353/58 |

(Continued)

FOREIGN PATENT DOCUMENTS

| | | |
|---|---|---|
| CN | 200710141339 | 2/2009 |
| CN | 200810108420 | 2/2009 |

(Continued)

*Primary Examiner* — Tony Ko
*Assistant Examiner* — Jori S Reilly-Diakun
(74) *Attorney, Agent, or Firm* — WPAT, PC; Justin King

(57) ABSTRACT

An airflow-guiding device for a light source includes a cap and a guiding element. The cap has an airflow inlet, a through opening, an airflow outlet, a foundation, an annular side wall, and a cover. The foundation is connected to a reflector of the light source. The through opening is located at the foundation and corresponding to a light outlet of the reflector. The annular side wall where the airflow inlet is located is disposed on the foundation. The cover where the airflow outlet is located is disposed on the annular side wall and opposite to the foundation. The guiding element includes a guiding opening and an annular body. The annular body is rotatably disposed in the cap. The annular body where the guiding opening is located surrounds at least part of the through opening and forms a guiding tunnel together with the annular side wall in the cap.

4 Claims, 13 Drawing Sheets

(56) References Cited

U.S. PATENT DOCUMENTS

2009/0027626 A1* 1/2009 Chang .............................. 353/52
2009/0103055 A1* 4/2009 Sun ................................. 353/52
2009/0244491 A1* 10/2009 Wang et al. ..................... 353/61
2011/0188006 A1* 8/2011 Lo et al. .......................... 353/61

FOREIGN PATENT DOCUMENTS

| | | |
|---|---|---|
| CN | 200810187175 | 5/2009 |
| TW | 477432 | 2/2002 |
| TW | I245598 | 5/2005 |
| TW | I252368 | 5/2006 |

* cited by examiner

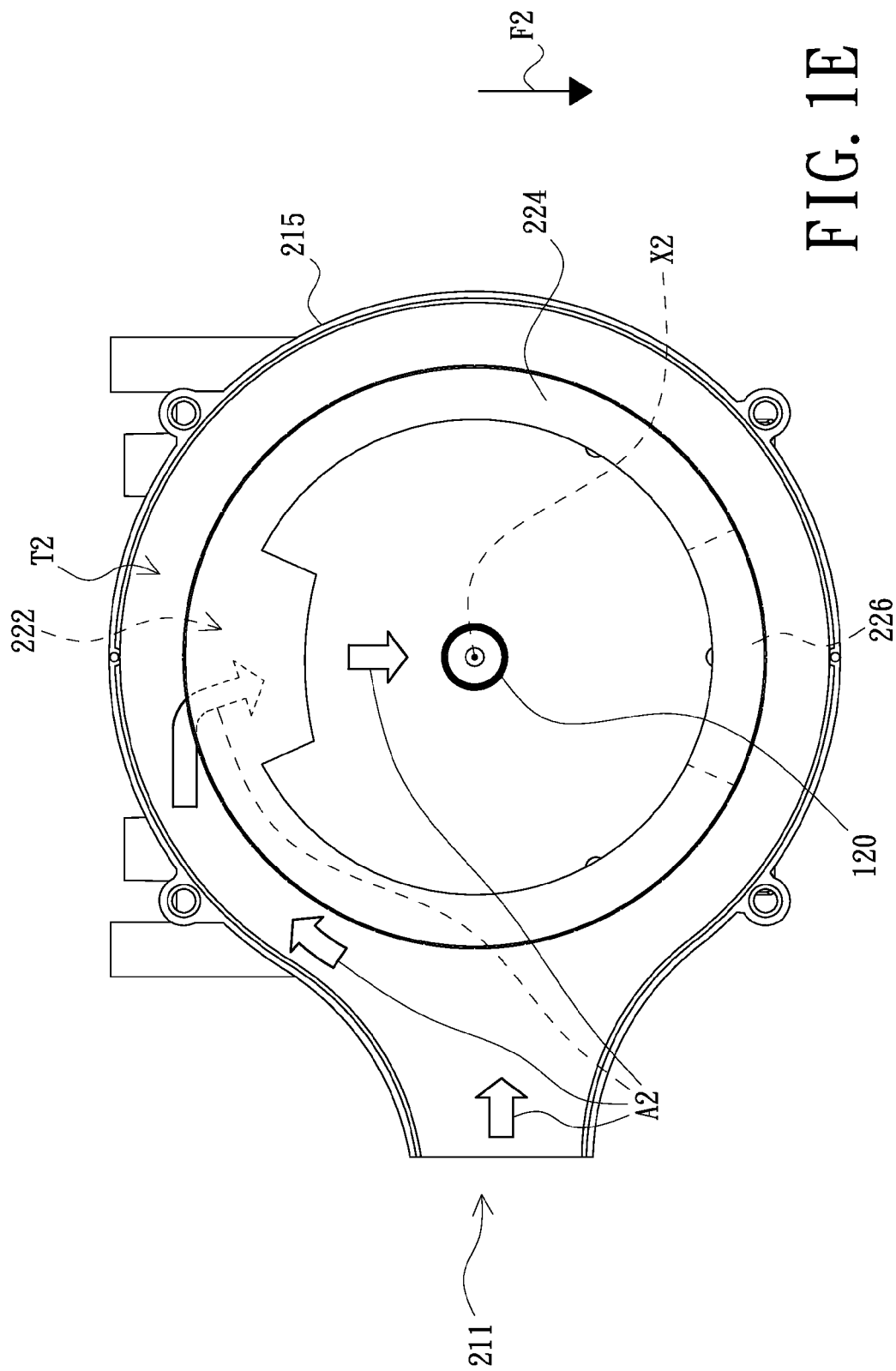

AIRFLOW-GUIDING DEVICE AND PROJECTOR

CROSS-REFERENCE TO RELATED APPLICATION

This application claims the priority benefit of China application serial no. CN200910207282.1, filed on Oct. 23, 2009. The entirety of the above-mentioned patent application is incorporated herein by reference and made a part of this specification.

BACKGROUND

1. Field of the Invention

The invention relates to an airflow-guiding device and in particular, to a projector with the airflow-guiding device.

2. Description of the Prior Art

A conventional projector includes a light source, an airflow generator, a light valve, and a projection lens. The light source is suitable for generating an illumination beam. The light source includes a reflector and a lampwick, and at least a portion of the lampwick is disposed in the reflector. The light valve is located in a transmission path of the illumination beam and suitable for transforming the illumination beam into an image beam. The projector lens is located in a transmission path of the image beam and suitable for projecting the image beam onto a screen.

The airflow generator generates an airflow for dissipating heat generated by the light source. Because of natural thermal convection phenomenon, the temperature of a top surface of the lampwick of the light source is relatively high while the temperature of a bottom surface of the lampwick is relatively low. For preventing the lampwick from being damaged, the temperature difference between the top surface and the bottom surface of the lampwick may be controlled in a specific range.

The techniques about guiding airflow generated by the airflow generator to control the temperature of the lampwick have been disclosed in many patents, such as Taiwan patent no. 477432, Taiwan patent no. 1252368, Taiwan patent no. 1245598 and US patent publication no. 20060017362. However, the conventional techniques about guiding airflow may not satisfy different requirements of other designers.

BRIEF SUMMARY

The invention is to provide an airflow-guiding device, and an annular body of a guiding element of the airflow-guiding device is rotatably disposed in the guiding element.

The invention is also to provide a projector, and an annular body of a guiding element of an airflow-guiding device of the projector is rotatably disposed in the guiding element.

Other advantages and objects of the invention may be further comprehended through the technical features disclosed in the invention.

In order to achieve at least one of the objectives or other objectives, in an embodiment of the invention, an airflow-guiding device applied to a projector with a light source is provided. The light source includes a reflector and a lampwick at least partly disposed in the reflector. The airflow-guiding device includes a cap and a guiding element. The cap has an airflow inlet, a through opening, and an airflow outlet. The cap includes a foundation, an annular side wall, and a cover. The foundation is suitable for being connected to the reflector. The through opening is located at the foundation and suitable for corresponding to a light outlet of the reflector. The annular side wall is disposed on the foundation and the airflow inlet is located at the annular side wall. The cover is disposed on the annular side wall and opposite to the foundation. The airflow outlet is located at the cover.

The guiding element has a guiding opening and includes an annular body. The annular body is rotatably disposed in the cap and the guiding opening is located at the annular body. The annular body surrounds at least a portion of the through opening. The annular body and the annular side wall together form a guiding tunnel in the cap.

In an embodiment of the invention, the guiding element further includes an additional weight structure disposed on the annular body such that the guiding opening is located at a position opposite to the direction of the gravity.

In an embodiment of the invention, the airflow-guiding device further includes a rod. The guiding element further has a plurality of inserting holes located at the annular body. The cap further has an arc-shaped guiding trench located at the cover. The rod is suitable for passing through the arc-shaped guiding trench and being detachably inserted into one of the inserting holes.

In an embodiment of the invention, the airflow-guiding device further includes a driving apparatus connected to the annular body and suitable for driving the annular body to rotate.

In order to achieve at least one of the objectives or other objectives, in an embodiment of the invention, a projector is provided. The projector includes a light source, an airflow-guiding device, an airflow generator, a light valve, and a projection lens. The light source includes a reflector and a lampwick. The reflector has a light outlet and at least a portion of the lampwick is disposed in the reflector. The lampwick is suitable for generating an illumination beam. The airflow generator is disposed at an airflow inlet of the airflow-guiding device. The light valve is located in a transmission path of the illumination beam and suitable for transforming the illumination beam into an image beam. The projector lens is located in a transmission path of the image beam and suitable for projecting the image beam onto a screen.

The annular body of the guiding element of the airflow-guiding device may be regulated such that the guiding opening is located at a position opposite to the direction of the gravity, so the heat at the top surface of the lampwick in operation may be dissipated by the airflow introduced into through the guiding opening. Thus, the temperature difference between the top surface and the bottom surface of the lampwick may be controlled in a certain range to prevent the lampwick from being damaged.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the embodiments of the invention, and are incorporated in and constitute part of this specification. The drawings illustrate embodiments of the invention and, together with the description, serve to explain the principles of the invention.

FIG. 1E is a schematic front view of the airflow-guiding device and the light source shown in FIG. 1B.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

First Embodiment

Figure 1A:
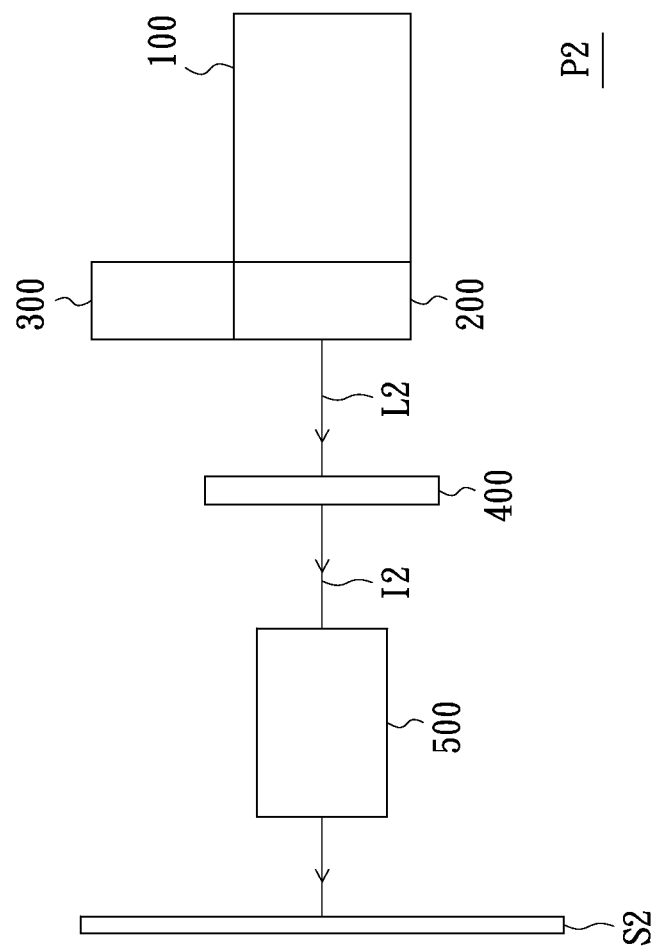
FIG. 1A is a schematic view of a projector according to a first embodiment of the invention.
Figure 1B:
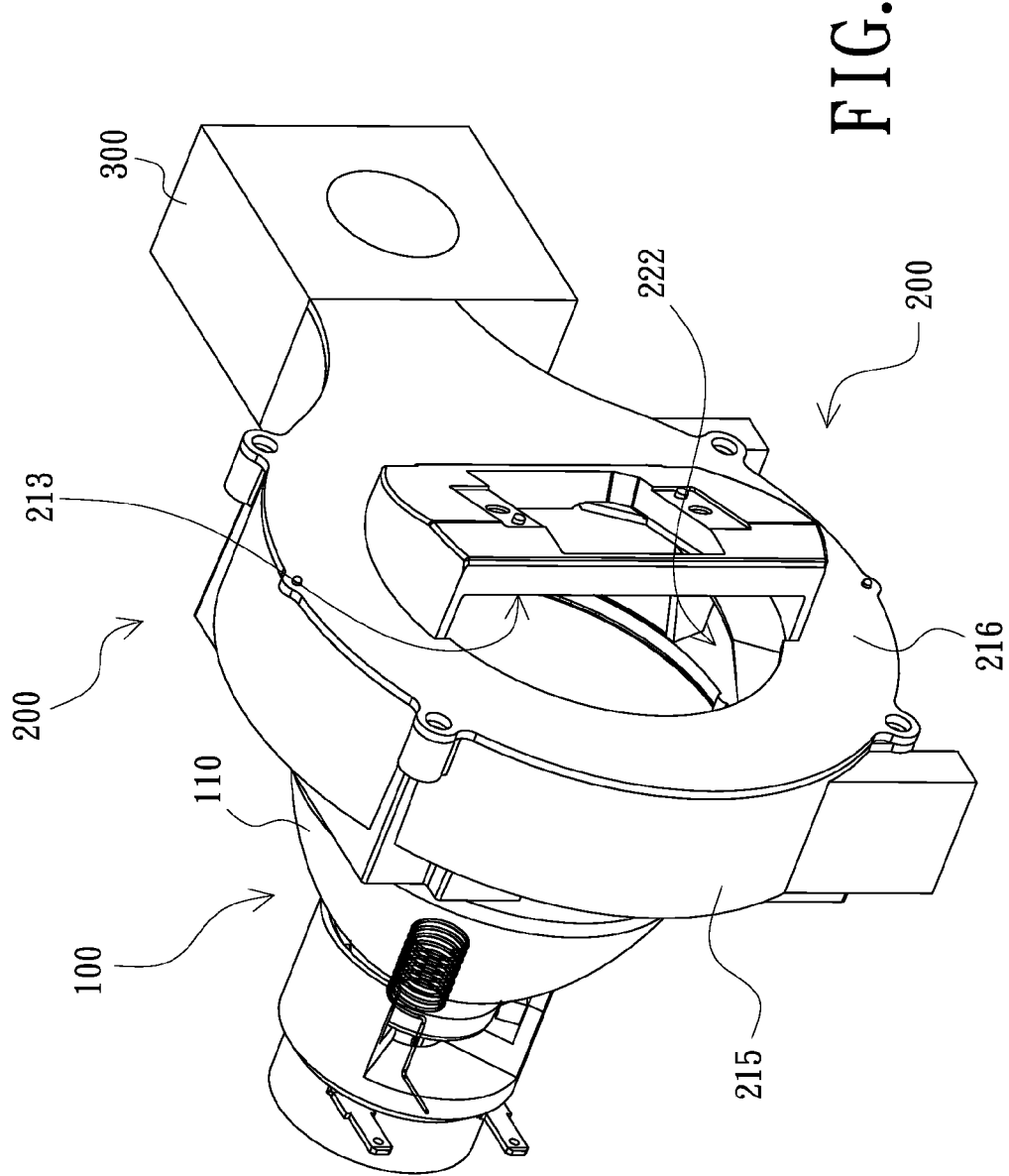
FIG. 1B is a schematic assembled three-dimensional view of an airflow-guiding device, a light source and an airflow generator shown in FIG. 1A.
Figure 1C:
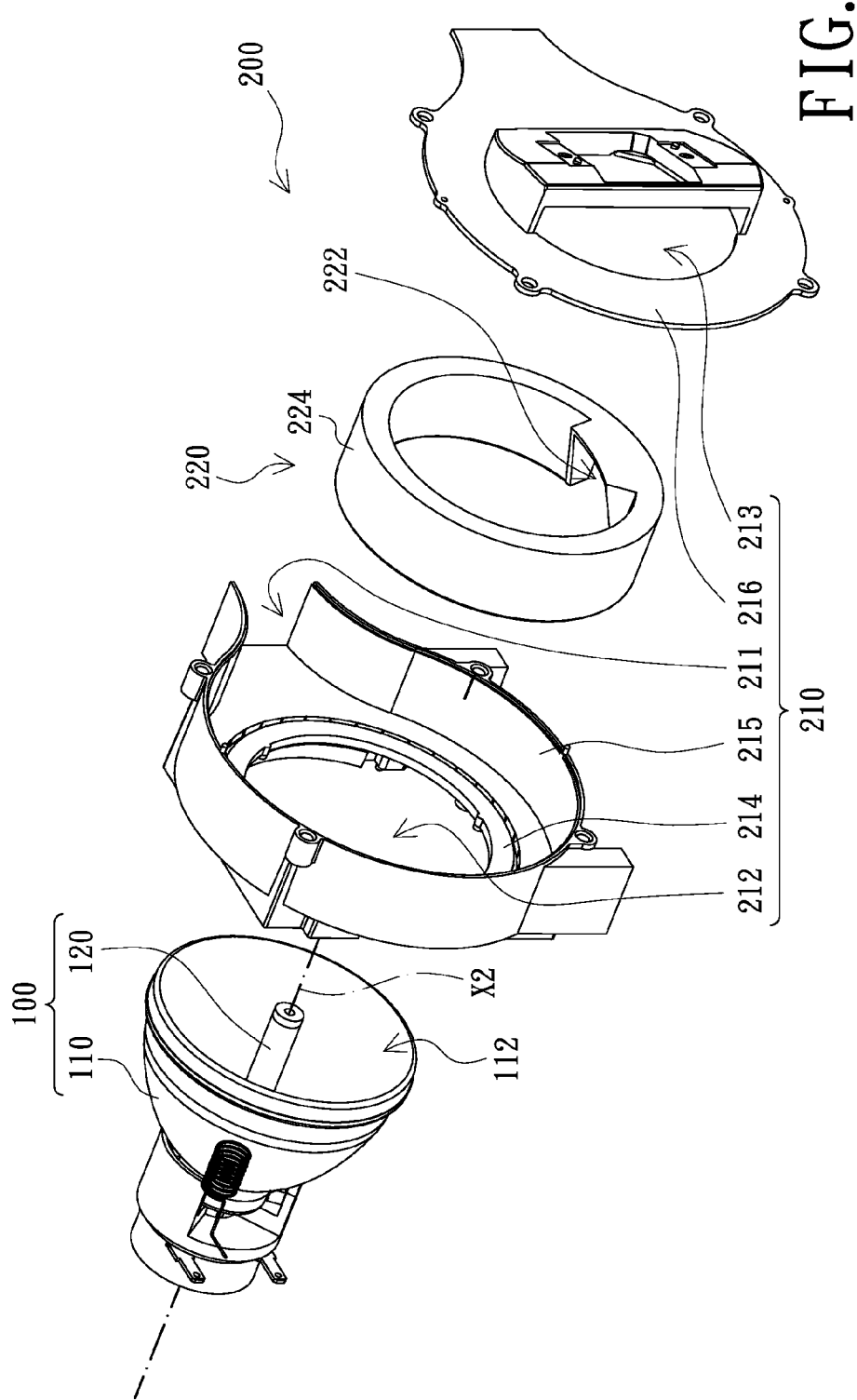
FIG. 1C is a schematic exploded three-dimensional view of the airflow-guiding device and the light source shown in FIG. 1B.
Figure 1D:
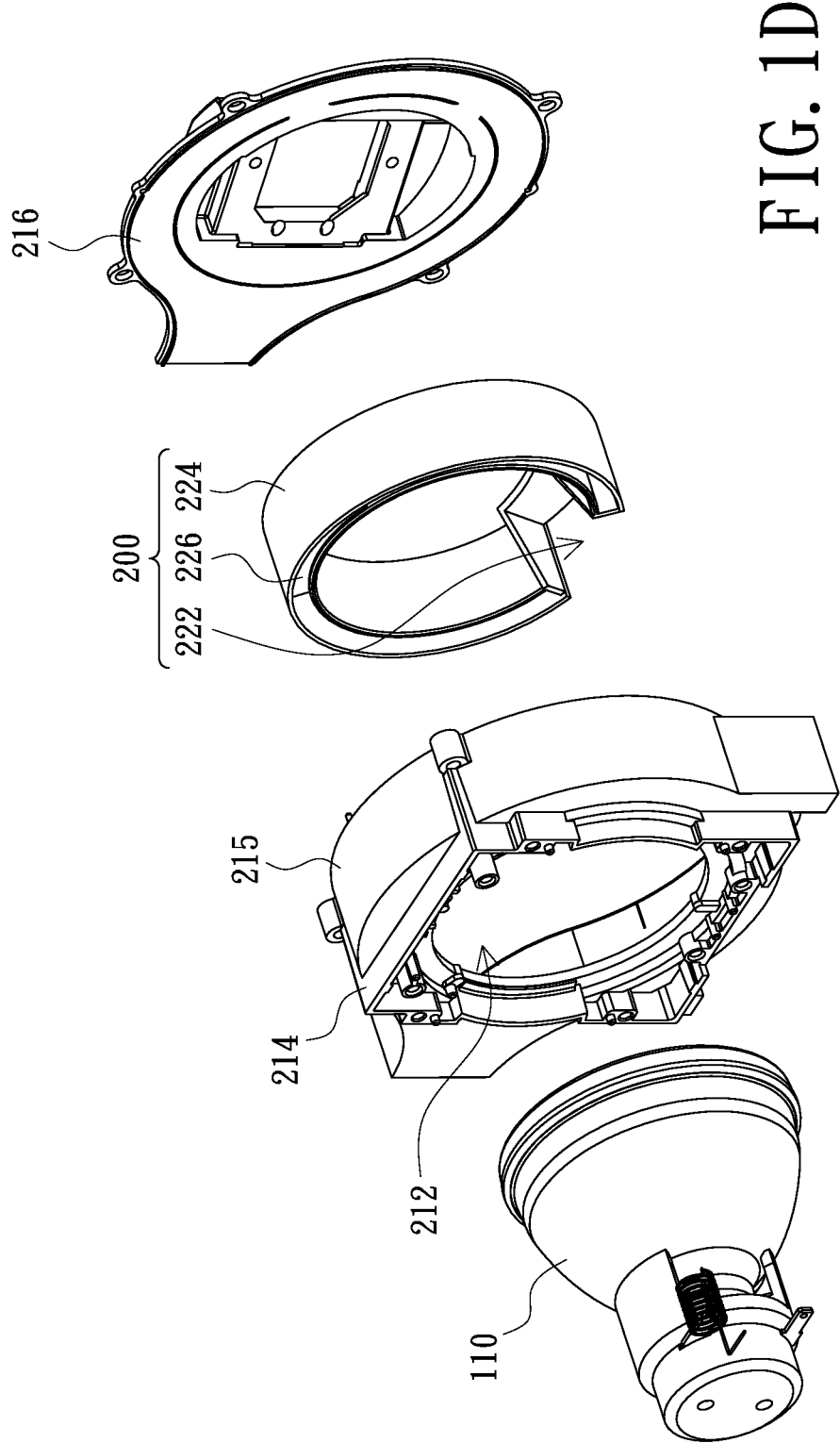
FIG. 1D is another schematic exploded three-dimensional view of the airflow-guiding device and the light source shown in FIG. 1B.

For the convenience of description, the cover 216 of the cap 210 of the airflow-guiding device 200 is not shown in FIG. 1E.

Referring to FIGS. 1A to 1E, the projector P2 of this embodiment includes a light source 100, an airflow-guiding device 200, an airflow generator 300, a light valve 400, and a projection lens 500. The light source 100 includes a reflector 110 and a lampwick 120. The reflector 110 has a light outlet 112 and at least a portion of the lampwick 120 is disposed in the reflector 110. The lampwick 120 is suitable for generating an illumination beam L2. The light valve 400 is located in a transmission path of the illumination beam L2 and suitable for transforming the illumination beam L2 into an image beam 12. The projector lens 500 is located in a transmission path of the image beam 12 and suitable for projecting the image beam 12 onto a screen S2.

The airflow-guiding device 200 includes a cap 210 and a guiding element 220. The cap 210 has an airflow inlet 211, a through opening 212, and an airflow outlet 213. The cap 210 includes a foundation 214, an annular side wall 215, and a cover 216. The foundation 214 is suitable for being connected to the reflector 110. The through opening 212 is located at the foundation 214 and corresponding to the light outlet 112 of the reflector 110. The annular side wall 215 is disposed on the foundation 214 and the airflow inlet 211 is located at the annular side wall 215. The cover 216 is disposed on the annular side wall 215 and opposite to the foundation 214. The airflow outlet 213 is located at the cover 216.

The guiding element 220 has a guiding opening 222 and includes an annular body 224 and an additional weight structure 226. The annular body 224 is rotatably disposed in the cap 210 and the guiding opening 222 is located at the annular body 224. In this embodiment, the annular body 224 is, for example, rotatably disposed at the foundation 214 and the annular body 224 is suitable for revolving around an optical axis X2 of the reflector 110. In addition, the annular body 224 surrounds at least a portion of the through opening 212. The annular body 224 and the annular side wall 215 together form a guiding tunnel T2 in the cap 210. The additional weight structure 226 is disposed at the annular body 224 such that the guiding opening 222 is located at a position opposite to the direction of the gravity F2. Besides, the airflow generator 300 is, for example, an axial fan and the airflow generator 300 is disposed at the airflow inlet 211 of the cap 210 of the airflow-guiding device 200.

The user may place the projector P2 at an appropriate position such that the airflow-guiding device 200 is located at a position as shown in FIG. 1E. The airflow generator 300 is suitable for generating an airflow A2 for dissipating heat generated by the light source 100. Specifically, the airflow A2 enters the guiding tunnel T2 through the airflow inlet 211 and enters the reflector 110 through the guiding opening 222 and the through opening 212. Then, the airflow A2 passes through the top surface of the lampwick 120 and leaves the reflector 110 through the through opening 212. Next, the airflow A2 leaves the airflow-guiding device 200 through the airflow outlet 213.

Because the guiding opening 222 is located at a position opposite to the direction of the gravity F2, the heat accumulated at the top surface of the lampwick 120 due to thermal convection is dissipated outside the airflow-guiding device 200 by means of the airflow A2 entering the reflector 110 through the guiding opening 222. Accordingly, the temperature difference between the top surface and the bottom surface of the lampwick 120 may be controlled in a specific range to prevent the lampwick 120 from being damaged.

Because the guiding element 220 has the additional weight structure 226, the annular body 224 may revolve around the optical axis X2 due to the addition weight structure 226 effected by the gravity F2 such that the guiding opening 222 is located at a position opposite to the direction of the gravity F2. Therefore, the projector P2 may be placed at an appropriate position the user want, such as being lain on a table or hung on a ceiling, and the heat at the top surface of the lampwick 120 in operation may be dissipated by the airflow A2 introduced into through the guiding opening 222.

Second Embodiment

Figure 2A:
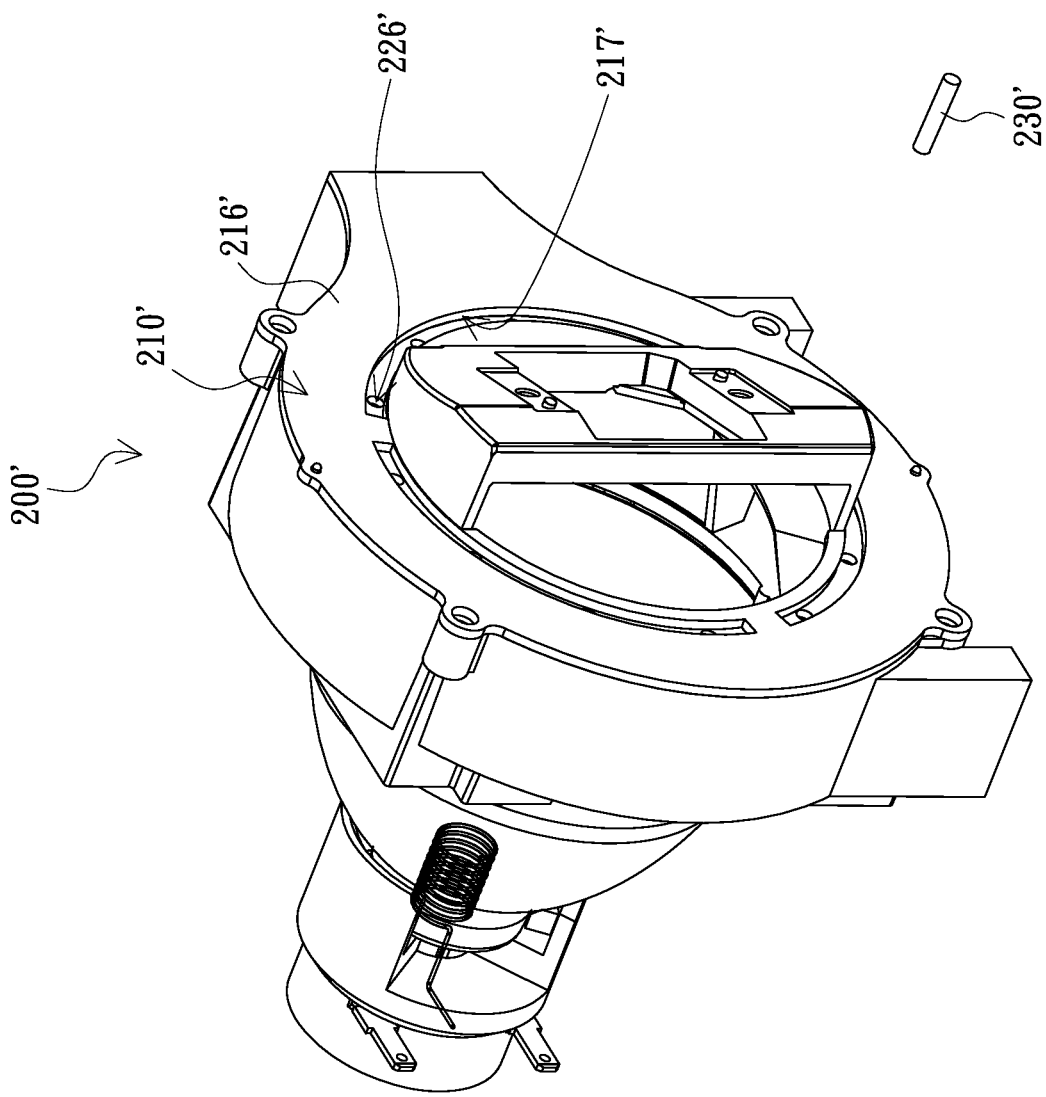
FIG. 2A is a schematic assembled three-dimensional view of the airflow-guiding device and the light source according to a second embodiment of the invention.
Figure 2B:
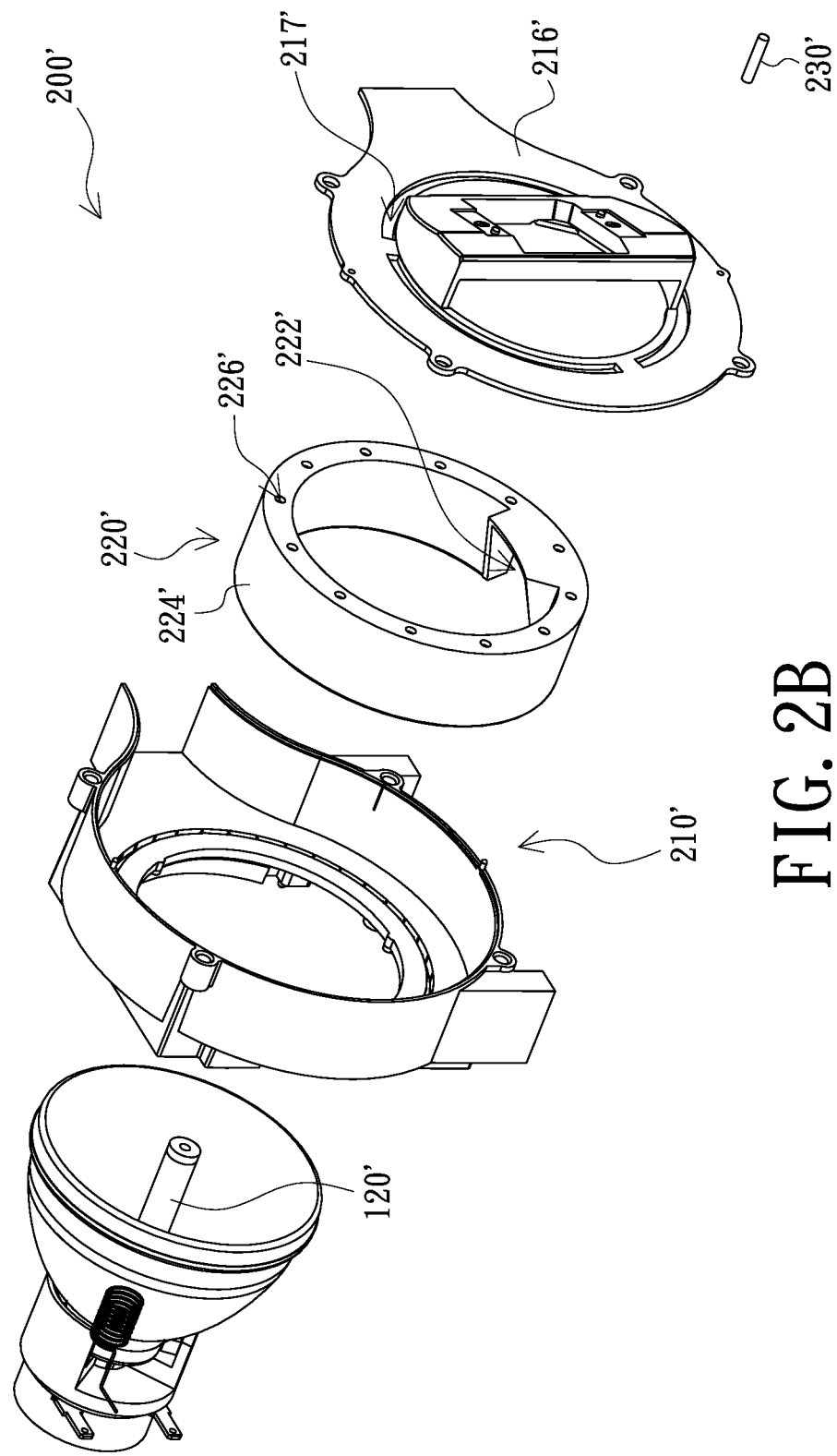
FIG. 2B is a schematic exploded three-dimensional view of the airflow-guiding device and the light source shown in FIG. 2A.
Figure 2C:
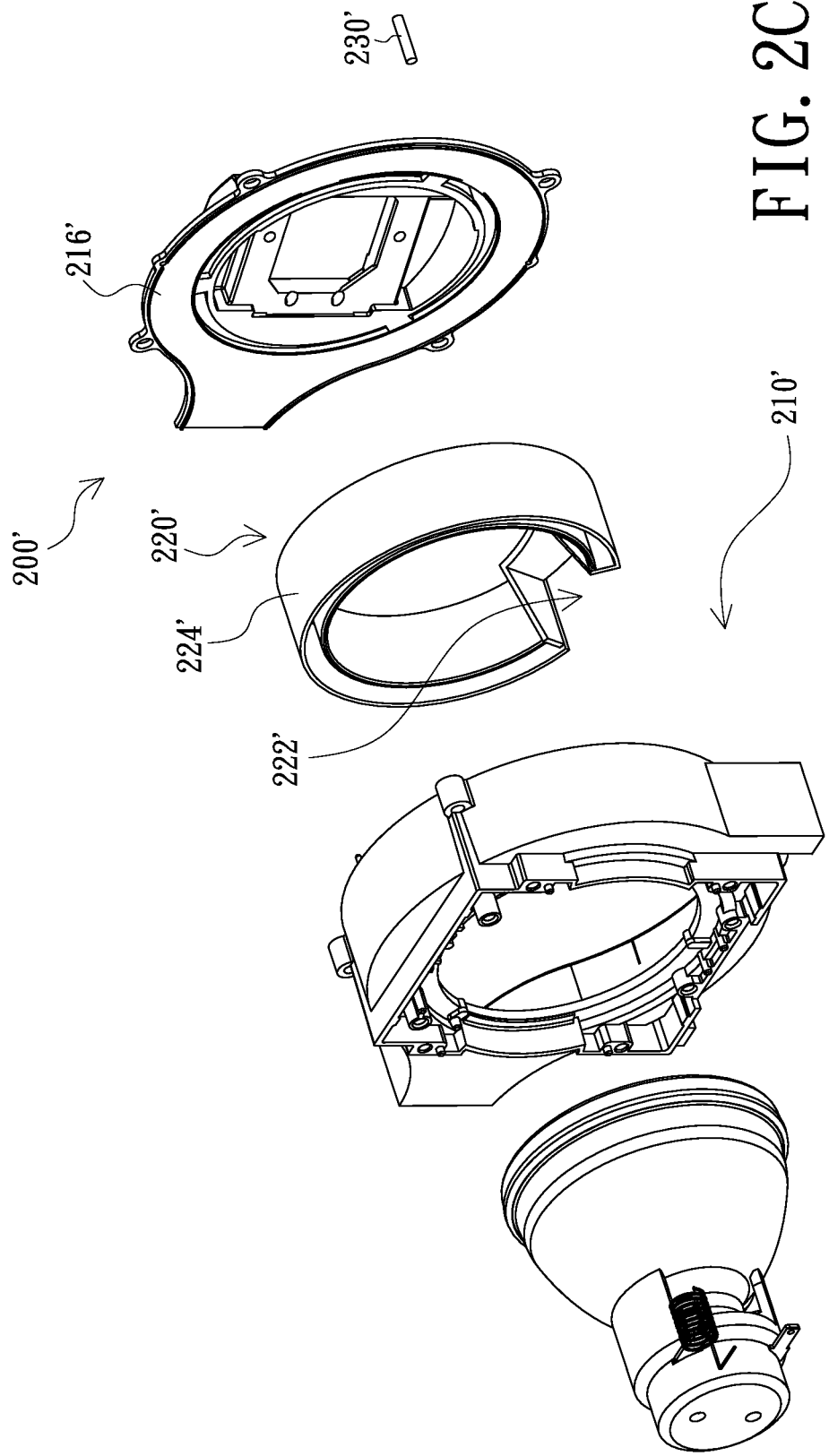
FIG. 2C is another schematic exploded three-dimensional view of the airflow-guiding device and the light source shown in FIG. 2A.
Figure 2D:
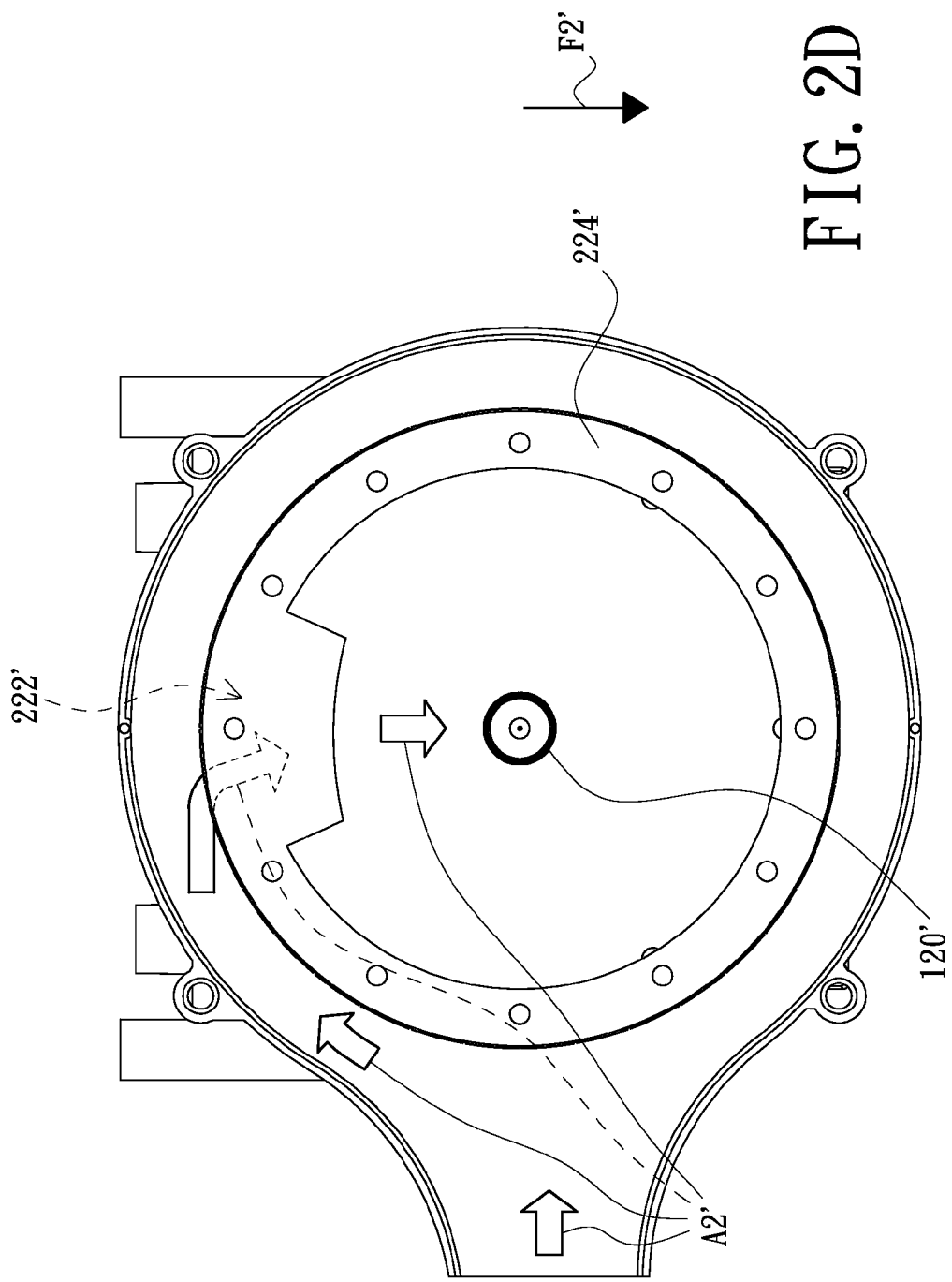
FIG. 2D is a schematic front view of the airflow-guiding device and the light source shown in FIG. 2A.

For the convenience of description, the cover 216' of the cap 210' of the airflow-guiding device 200' is not shown in FIG. 2D. Referring to FIGS. 2A to 2D, the difference between the airflow-guiding device 200' of this embodiment and the airflow-guiding device 200 of the first embodiment is that the addition weight structure 226 is omitted in the airflow-guiding device 200' of this embodiment. In addition, the airflow-guiding device 200' of this embodiment further includes a rod 230' and the guiding element 220' further includes a plurality of inserting holes 226' located at the annular body 224'. The cap 210' further has at least an arc-shaped guiding trench 217' located at the cover 216'. The rod 230' is suitable for passing through one of the arc-shaped guiding trenches 217' and being detachably inserted into one of the inserting holes 226'.

The user may rotate the annular body 224' by means of inserting the rod 230' into one of the inserting holes 226' such that the annular body 224' is regulated to a position as shown in FIG. 2D. Meanwhile, the direction of the gravity F2' is vertically downward. The heat at the top surface of the lampwick 120' in operation may be dissipated by the airflow A2' introduced into through the guiding opening 222'.

Third Embodiment

Figure 3A:
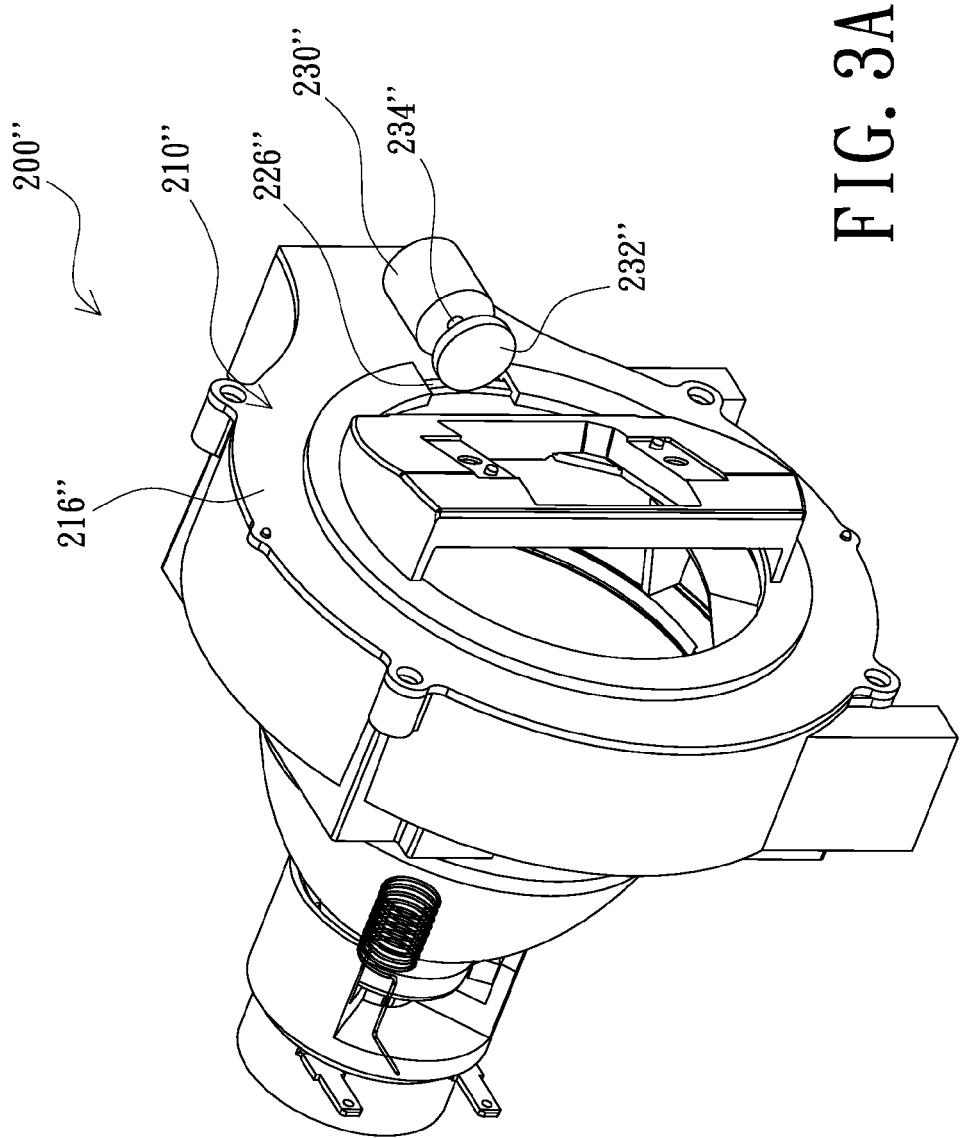
FIG. 3A is a schematic assembled three-dimensional view of the airflow-guiding device and the light source according to a third embodiment of the invention.
Figure 3B:
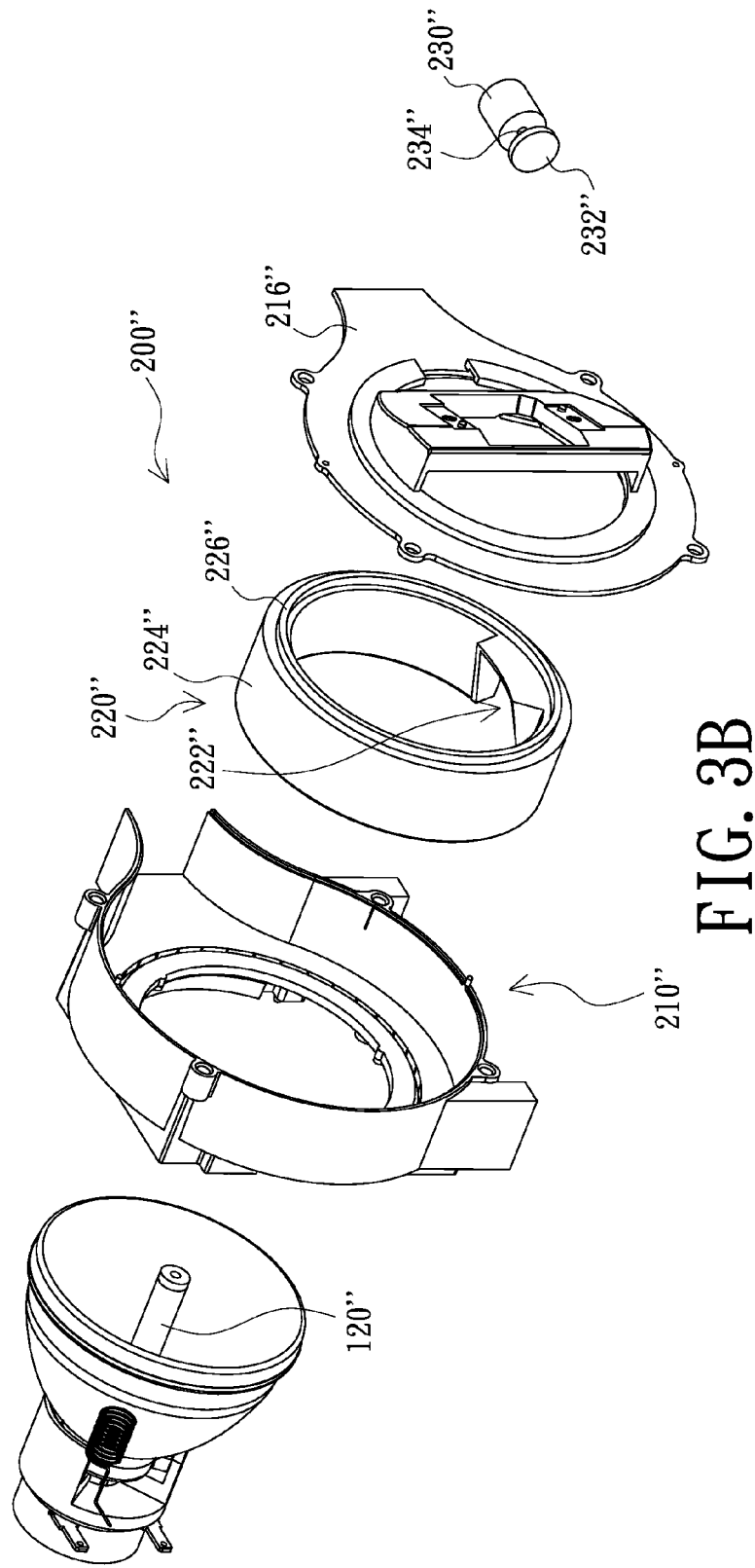
FIG. 3B is a schematic exploded three-dimensional view of the airflow-guiding device and the light source shown in FIG. 3A.
Figure 3C:
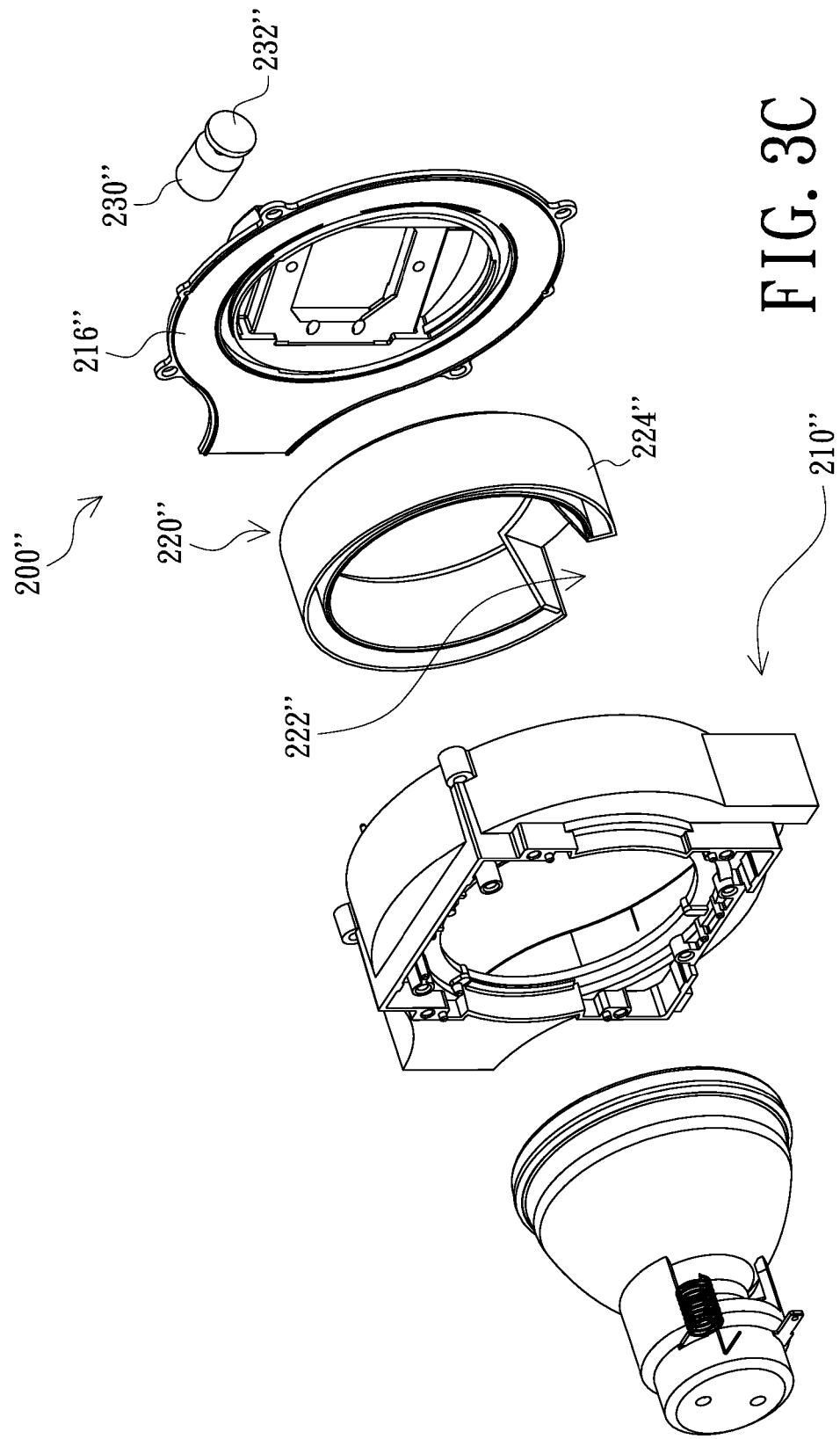
FIG. 3C is another schematic exploded three-dimensional view of the airflow-guiding device and the light source shown in FIG. 3A.
Figure 3D:
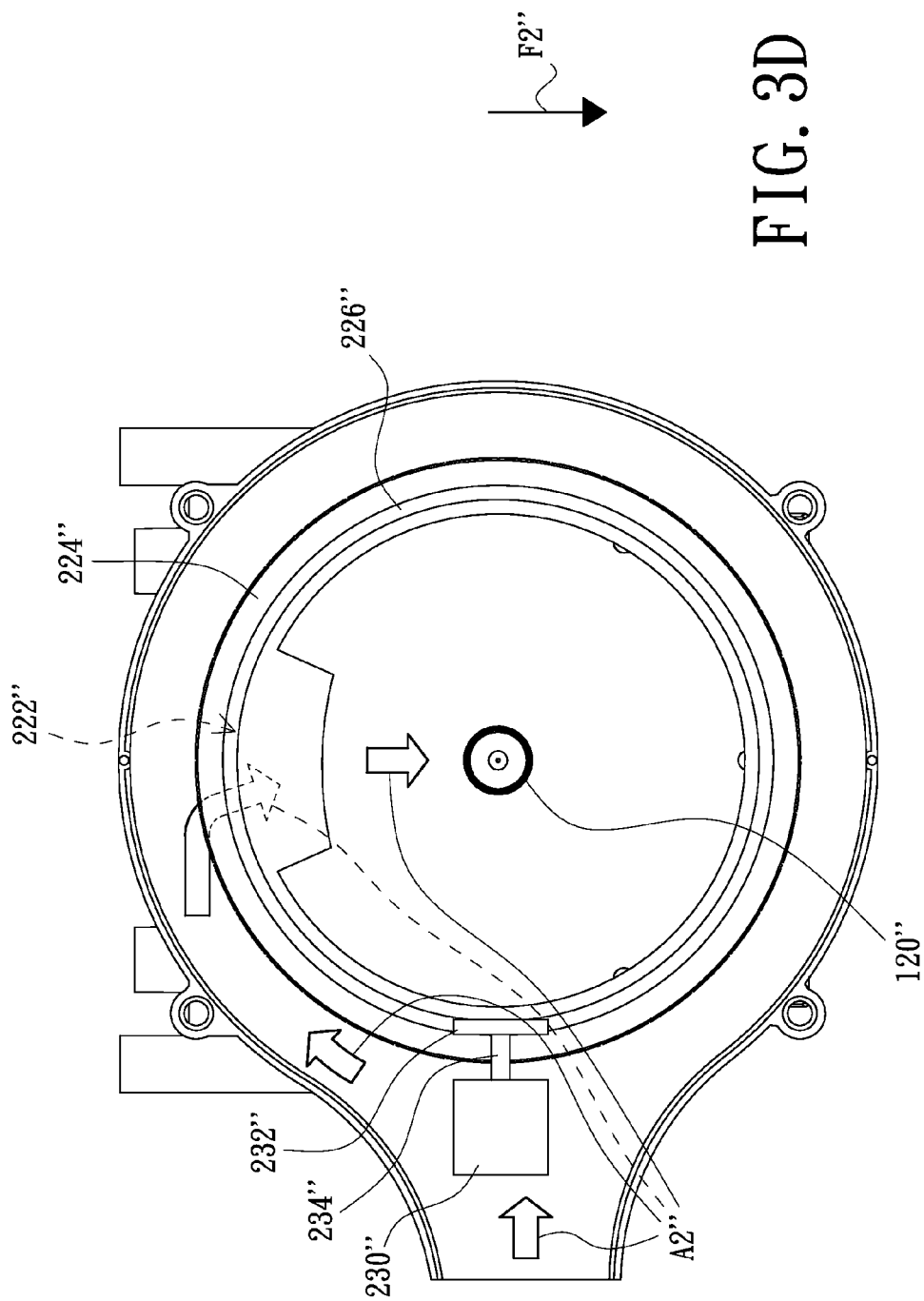
FIG. 3D is a schematic front view of the airflow-guiding device and the light source shown in FIG. 3A.

For the convenience of description, the cover 216" of the cap 210" of the airflow-guiding device 200" is not shown in FIG. 3D. Referring to FIGS. 3A to 3D, the difference between the airflow-guiding device 200" of this embodiment and the airflow-guiding device 200 of the first embodiment is that the addition weight structure 226 is omitted in the airflow-guiding device 200" of this embodiment. In addition, the airflow-guiding device 200" of this embodiment further includes a driving apparatus 230". The driving apparatus 230" is connected to the annular body 224" and suitable for driving the annular body 224" to rotate.

Specifically, the driving apparatus 230", such as a motor, includes a gear 232", and a rotational shaft 234". The gear 232" is disposed at the rotational shaft 234". The guiding element 220" further includes an annular gear rack 226" disposed at the annular body 224". The gear 232" meshes with the annular gear rack 226". During operation of the driving apparatus 230", the rotational shaft 234" drives the gear 232" to rotate such that the annular body 224" is driven to rotate. By means of the forgoing driving manner, the annular body 224" may be regulated to a position as shown in FIG. 3D. Meanwhile, the direction of the gravity F2" is vertically downward. The heat at the top surface of the lampwick 120" may be dissipated by the airflow A2" introduced into through the guiding opening 222".

According to the mentioned above, the airflow-guiding device and the projector of the embodiment of the invention has at least one of the following or other advantages. When the projector projects through any angle, the annular body of the guiding element of the airflow-guiding device may be regulated such that the guiding opening is located at a position opposite to the direction of the gravity, so the heat at the top surface of the lampwick in operation may be dissipated by the airflow introduced into through the guiding opening. Thus, the temperature difference between the top surface and the bottom surface of the lampwick may be controlled in a specific range to prevent the lampwick from being damaged.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An airflow-guiding device, applied to a projector with a light source having a reflector and a lampwick at least partly disposed in the reflector, comprising:
   a cap, having an airflow inlet, a through opening, and an airflow outlet and comprising:
      a foundation, suitable for being connected to the reflector, wherein the through opening is located at the foundation and suitable for corresponding to a light outlet of the reflector;
      an annular side wall, disposed on the foundation, wherein the airflow inlet is located at the annular side wall; and
      a cover, disposed on the annular side wall and opposite to the foundation,
   wherein the airflow outlet is located at the cover; and
   a guiding element, having a guiding opening and comprising:
      an annular body, rotatably disposed in the cap, wherein the guiding opening is located at the annular body, the annular body surrounds at least a portion of the through opening, and the annular body and the annular side wall together form a guiding tunnel in the cap, and an additional weight structure disposed on the annular body such that the guiding opening is located at a position opposite to the direction of the gravity, wherein the guiding opening and the additional weight structure are disposed at opposite sides of the lampwick in the direction of gravity such that an airflow directly passes through a to surface of the lampwick.

2. The airflow-guiding device of claim 1, further comprising a rod, wherein the guiding element further has a plurality of inserting holes located at the annular body, the cap further has an arc-shaped guiding trench located at the cover, and the rod is suitable for passing through the arc-shaped guiding trench and being detachably inserted into one of the inserting holes.

3. A projector, comprising:

a light source, comprising:

a reflector, having a light outlet; and a lampwick, at least partly disposed in the reflector and suitable for generating an illumination beam; and an airflow-guiding device, comprising:

a cap, having an airflow inlet, a through opening, and an airflow outlet and comprising:

a foundation, connected to the reflector, wherein the through opening is located at the foundation and corresponding to the light outlet;

an annular side wall, disposed on the foundation, wherein the airflow inlet is located at the annular side wall; and a cover, disposed on the annular side wall and opposite to the foundation, wherein the airflow outlet is located at the cover; and a guiding element, having a guiding opening and comprising:

an annular body, rotatably disposed in the cap, wherein the guiding opening is located at the annular body, the annular body surrounds at least a portion of the through opening, and the annular body and the annular side wall together form a guiding tunnel in the cap, and an additional weight structure disposed on the annular body such that the guiding opening is located at a position opposite to the direction of the gravity, wherein the guiding opening and the additional weight structure are disposed at opposite sides of the lampwick in the direction of gravity such that an airflow directly passes through a to surface of the lampwick;

an airflow generator, disposed at the airflow inlet;

a light valve, located in a transmission path of the illumination beam and suitable for transforming the illumination beam into an image beam; and a projection lens, located in the transmission path of the image beam and suitable for projecting the image beam onto a screen.

4. The projector of claim 3, wherein the airflow-guiding device further comprises a rod, wherein the guiding element further has a plurality of inserting holes located at the annular body, the cap further has an arc-shaped guiding trench located at the cover, and the rod is suitable for passing through the arc-shaped guiding trench and being detachably inserted into one of the inserting holes.

* * * * *